United States Patent
Spindelbalker

US006905204B2

(10) Patent No.: US 6,905,204 B2
(45) Date of Patent: Jun. 14, 2005

(54) SPECTACLE FRAME

(75) Inventor: Rupert Spindelbalker, Puchenau (AT)

(73) Assignee: Silhouette International Schmied AG, Linz (AT)

(*) Notice: Subject to any disclaimer, the term of this patent is extended or adjusted under 35 U.S.C. 154(b) by 0 days.

(21) Appl. No.: 10/498,538

(22) PCT Filed: Nov. 6, 2002

(86) PCT No.: PCT/AT02/00311
§ 371 (c)(1),
(2), (4) Date: Jun. 14, 2004

(87) PCT Pub. No.: WO03/052490
PCT Pub. Date: Jun. 26, 2003

(65) Prior Publication Data
US 2005/0083480 A1 Apr. 21, 2005

(30) Foreign Application Priority Data
Dec. 19, 2001 (AT) .................................. A 1984/2001

(51) Int. Cl.⁷ .............................................. G02C 00/00
(52) U.S. Cl. ......................................... 351/41; 351/178
(58) Field of Search ................................... 351/41, 178

(56) References Cited

U.S. PATENT DOCUMENTS

| | | | | |
|---|---|---|---|---|
| 4,896,955 A | | 1/1990 | Zider et al. .................... | 351/41 |
| 4,898,622 A | | 2/1990 | Kuze .......................... | 72/201 |
| 5,102,215 A | * | 4/1992 | Nakanishi .................... | 351/41 |
| 5,640,217 A | * | 6/1997 | Hautcoeur et al. ............ | 351/41 |

FOREIGN PATENT DOCUMENTS

| | | |
|---|---|---|
| DE | 32 21 645 | 1/1983 |
| DE | 36 11 981 | 1/1987 |
| DE | 36 17 685 | 12/1987 |
| DE | 41 40 262 | 6/1993 |
| EP | 0119 501 | 9/1984 |

* cited by examiner

Primary Examiner—Huy Mai
(74) Attorney, Agent, or Firm—Collard & Roe, P.C.

(57) ABSTRACT

A spectacle frame comprises frame parts which are made of chrome nickel steel and produced by cold-forming. In order to provide advantageous constructional conditions, it is proposed that the frame parts consist of a chrome nickel steel with a minimum strength 950 MPa.

3 Claims, No Drawings

SPECTACLE FRAME

CROSS REFERENCE TO RELATED APPLICATIONS

Applicant claims priority under 35 U.S.C. §119 of Austrian Application No. A 1984/2001 filed on Dec. 19, 2001. Applicants also claim priority under 35 U.S.C. §365 of PCT/AT02/00311 filed on Nov. 6, 2002. The international application under PCT article 21(2) was not published in English.

FIELD OF THE INVENTION

The invention relates to a spectacle frame with at least one frame part which is made of chrome nickel steel and is produced by cold-forming.

DESCRIPTION OF THE PRIOR ART

Chrome nickel steels are used in the spectacle industry especially for producing frame parts made of wire. The conventional, stainless spring steel wires offer the advantage of high strength, but cannot be used for the cold-forming of frame parts. Moreover, they offer a negative thermal stability, which is especially disadvantageous during soldering. Apart from spring steel, chrome nickel steel is used for stamping frame parts. Such chrome nickel steel allows cold-forming, but it is linked to a comparatively high hardening, so that frequent intermediate annealing is necessary. The high hardening leads to a high stress on the stamping and punching tools. Concerning the thermal stability there are similarly unfavorable conditions as in spring steel. Finally, the use of chrome steel is known which is usually supplied as pre-hardened and pre-tempered sheet metal and is used for making frame parts. As a result of the high strength however, no punching is possible so that the frame parts need to be etched out of the sheet metal or need to be cut by means of laser beams. The advantage of this chrome steel is the high thermal stability which allows soldering without having to fear any impermissible loss of strength.

Although chrome nickel steel shows a high resistance to corrosion and can achieve high strength through hardening, parts for spectacles made of such chrome nickel steel can only be produced within limits because the thermal treatment of the chrome nickel steel in connection with the soldering entails at least in sections the loss of the strength previously achieved by hardening, which strength can subsequently no longer be reproduced by renewed hardening because the necessary thermal treatment would exceed the ability of the soldered connection to withstand the thermal stress.

SUMMARY OF THE INVENTION

The invention is thus based on the object of providing a spectacle frame of the kind mentioned above in such a way that the cold-formed frame parts are joined with each other by means of soldered connections or can be connected to other frame parts.

The invention achieves this object in such a way that the frame part consists of a chrome nickel steel with a minimum strength of 950 MPa.

The precondition for the soldering of the cold-formed frame parts is created by using a chrome nickel steel of a minimum strength of 950 MPa without having to fear the loss of the required dimensional stability because said dimensional stability, which is given by the minimum strength of the chrome nickel steel, cannot be fallen below by a thermal treatment. This means that the frame parts made of such chrome nickel steel maintain their high strength and elasticity values despite the soldered connections, because the thermal treatments caused by the soldering will be effective in a very limited local way and moreover only lead to a very limited loss of strength.

The chosen magnitude of minimum strength of chrome nickel steel which can be set by respective alloy additives primarily depends on the stress imposed by the tools used for the cold-forming of the frame parts. Since the precondition for a high inherent strength of the cold-formed frame parts is improved with a higher minimum strength of the chrome nickel steel on the one hand, and the stress imposed by the tools is increased on the other hand, respective limits are imposed on the increase of the minimum strength of the chrome nickel steel used for the production of frame parts, although practice has shown that with increasing minimum strength the increase in strength by cold-forming will be lower, which allows higher forming degrees without intermediate annealing. If the minimum strength of chrome nickel steel for frame parts of spectacles is increased from 1000 to 1050 MPa, sufficiently economic production conditions for the frame parts in accordance with the invention can be ensured with a respective configuration of the tools.

Chrome nickel steel with a minimum strength of 950 MPa can have a different composition. Especially advantageous chrome nickel steel can contain for example 0.05 percent by weight of carbon, 17 percent by weight of chromium, 4 percent by weight of nickel, 3.5 percent by weight of copper, 0.3 percent by weight of niobium. Such chrome nickel steel can be subjected to precipitation-hardening at temperatures which do not endanger the soldered connections of the frame parts made from such chrome nickel steel, so that the spectacle frames can be brought to the desired strength by precipitation-hardening after the soldering. As a result of the higher strengths, the frame parts can be provided with smaller dimensions.

What is claimed is:

1. A spectacle frame with at least one frame part which is made of chrome nickel steel and is produced by cold-forming, characterized in that the frame part consists of a chrome nickel steel with a minimum strength of 950 MPa.

2. A spectacle frame as claimed in claim 1, wherein the chrome nickel steel of the frame part has a minimum strength of 1000 to 1050 MPa.

3. A spectacle frame as claimed in claim 1, wherein the frame part consists of a chrome nickel steel which can be hardened by precipitation-hardening.

* * * * *